(12) United States Patent
Kramer

(10) Patent No.: US 6,425,720 B1
(45) Date of Patent: Jul. 30, 2002

(54) SUBSTRATE ATTACHING MEMBER

(76) Inventor: Hy Kramer, 50 Carter Dr., Stamford, CT (US) 06902

( * ) Notice: Subject to any disclaimer, the term of this patent is extended or adjusted under 35 U.S.C. 154(b) by 0 days.

(21) Appl. No.: 09/514,232

(22) Filed: Feb. 28, 2000

(51) Int. Cl.⁷ .................................................. F16B 43/00
(52) U.S. Cl. .................... 411/533; 411/480; 411/372.5; 52/410; 52/512
(58) Field of Search ........................... 411/372.5, 372.6, 411/373, 480, 396, 533, 368; 52/512, 410

(56) References Cited

U.S. PATENT DOCUMENTS 3,088,361 A * 5/1963 Hallock
4,884,932 A * 12/1989 Meyer
5,118,235 A * 6/1992 Dill
5,607,272 A * 3/1997 Olvera
5,626,451 A * 5/1997 Seibert

* cited by examiner

*Primary Examiner*—Flemming Saether

(57) ABSTRACT

A fastener for securing insulation panels to a structural substrate. The fastener comprising an integral cover and a brim connected to a funnel terminating in a hole. The hole allows a screw to pass through so as to connect the fastener to the structural substrate. The cover in the closed position creates a reservoir which facilitates bonding of the fastener to a surface coating applied over the fastener. The funnel has at least one hole which secures the fastener to the insulation panels and helps prevent rotation of the fastener.

4 Claims, 1 Drawing Sheet

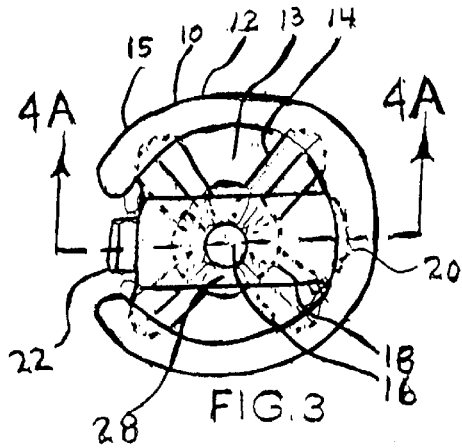
FIG. 3
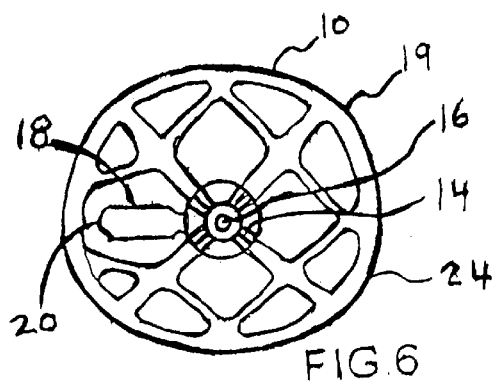
FIG. 6
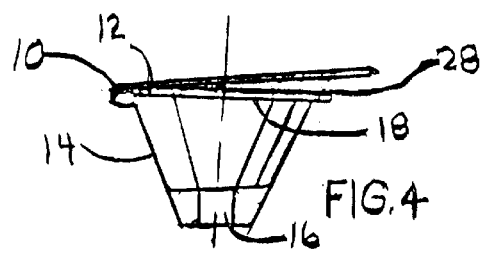
SECTION 4A-4A  FIG. 4
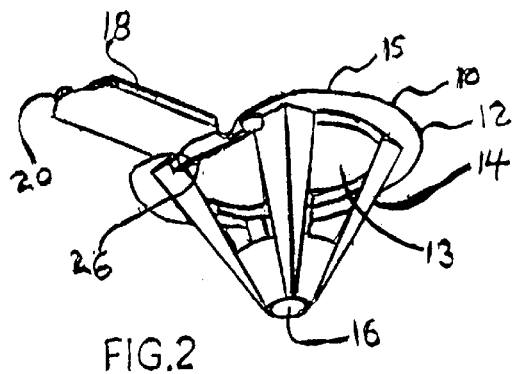
FIG. 2
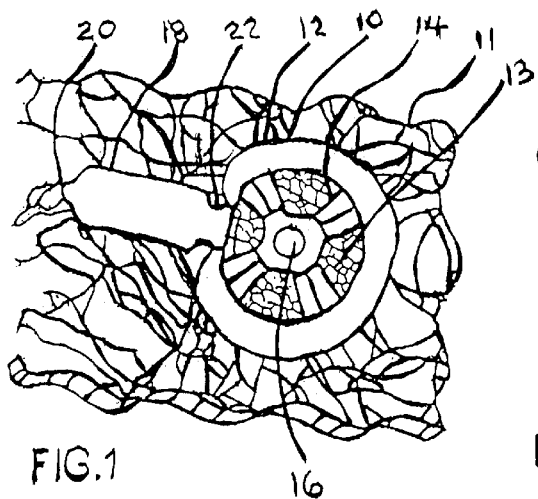
FIG. 1
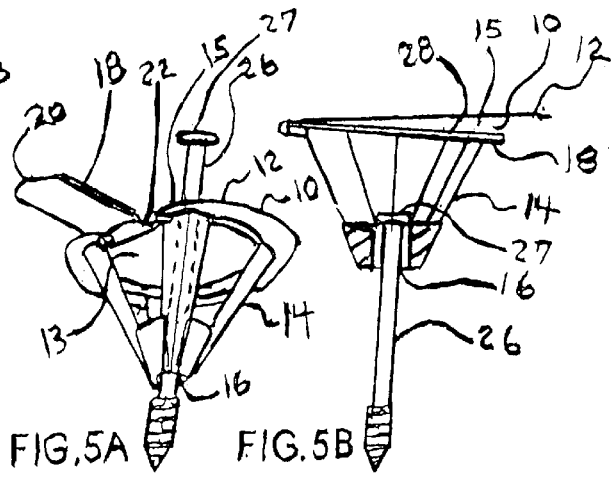
FIG. 5A  FIG. 5B

SUBSTRATE ATTACHING MEMBER

BACKGROUND OF THE INVENTION

1. Field of the Invention

The present invention is directed to a load distributive fastener for use in attaching compressible material to another member. This invention pertains to building construction and more particularly to apparatus for attaching insulation panels to structural substrates.

2. Background Art

One example of use for the fastener of the present invention is the application of insulation material to an exterior wall for the improvement of weather proofing and to aid in a finishing system. There are a number of fasteners in the industry that hold material to a substrate. For example, U.S. Pat. No. 5,118,235, issued to Dill, discloses a washer having a vertical flap that is used to close off the opening of his fastener. The Dill fastener has a number of features that distinguish it from the fastener of the present invention.

U.S. Pat. No. 5,171,118, issued to Rothenbuhler, discloses a fastener having a number of sector-shaped parts that are used to partially close up the opening and make preparation for the top surface.

U.S. Pat. No. 5,626,451, issued to Seibert, discloses a fasterner having fingers that automatically partially close up the opening when the fastener secured to the substrate.

Although these inventions may work, they do not offer the foundation the present invention offers, which foundation prepares the base surface for the finish coat. There are many known fasteners that may function satisfactorily for their intended uses. However, there is always a need to improve fastening capability to secure a substrate to a surface.

SUMMARY OF THE INVENTION

The present invention comprises a fastener for attaching insulation panels to structural substrates. The fastener comprises a funnel terminating in a unique brim containing a coplanar cover. The funnel has holes that allow the insulation to pass through as the fastener is pushed into the insulation material. These holes and resultant entry of insulation material help secure the fastener to the insulation. The cover is integral with the brim and can be lifted and pushed 180 degrees such that it fits through a hole in the center of the brim, thus at least partially covering the entrance to the funnel. A tab on the cover snaps under the brim and is downwardly angled relative to the brim thus creating a reservoir which is useful in assuring adherence of the fastener to a coating applied over the insulation. Coating material accumulates in the reservoir, i.e. the area above the cover, flows down the side of the cover into the funnel and secures the fastener. The connection between the brim and the cover may comprise a thinned out section of the brim easing movement of one part relative to the other.

There is an opening at the bottom of the funnel that allows for an attachment member such as a screw. Member of this sort are clearly known in the industry but the seating area of the fastening members so made that it will not allow the head of the attaching member to pass through the opening at the bottom of the funnel. When the cover is in a closed position it hides the attaching member and the attaching member and the attaching member becomes completely hidden when the coating material is applied underneath the cover.

Fasteners already in the public domain are complex and highly expensive to manufacture. The present invention, in contrast, is very simple and inexpensive to manufacture.

Further details and benefits of the invention become obvious when the detailed description is read in conjunction with the drawings.

Modifications may occur to persons skilled in the art that can be made without departing from the scope of the invention, as defined in this application and including the claims herein. While the present invention has been set forth for purposes of illustration, the descriptions herein should not be considered a limitation of the invention.

Accordingly, it is an object of the invention to produce a fastener that is simple and cheaper to manufacture than prior art fasteners.

It is a further object of the invention to produce a fastener having integral and coplanar brim and cover components.

It is yet a further object of the invention to produce a fastener that resists rotation in the substrate material into which it is inserted.

It is still a further object of the invention to produce a fastener having a design that allows for a good fastener to coating material bond.

The invention is a fastener for securing insulation panels to a structural substrate. The fastener comprising an integral cover and brim connected to a funnel terminating in a hole. The hole allows a screw to pass through so as to connect the fastener to the structural substrate. The cover in the closed position creates a reservoir which facilitates bonding of the fastener to a surface coating applied over the fastener. The funnel has holes in it which secure the fastener to the insulation panels and help prevent rotation of the fastener.

BRIEF DESCRIPTION OF THE DRAWINGS

When read in conjunction with the drawings, additional objects, features, details and benefits will become evident.

FIG. 1 shows the fastener of the present invention inserted into a substrate.

FIG. 2 is a perspective view of the fastener of FIG. 1.

FIG. 3 is a top view of the fastener of FIGS. 1 and 2 with the cover in the closed position.

FIG. 4 is a longitudinal cross section of the fastener taken along lines 4A—4A.

FIG. 5A is a perspective view of the fastener with a screw disposed within the funnel and brim.

FIG. 5B is a side view of the fastener with the screw contacting the bottom of the funnel.

FIG. 6 is a top view of an alternate embodiment of the fastener having a spider-like larger brim.

DETAILED DESCRIPTION OF THE DRAWINGS

FIG. 1 illustrates a fastener 10 of the present invention inserted into a substrate 11, such as insulation. Fastener 10 comprises an integral brim and cover element 12 connected to a funnel 14 having holes 13 in it. Holes 13 allow substrate 11 to enter funnel 14 thus making it more difficult to rotate the inserted fastener 10. Brim and cover element 12 contains a brim 15 and a cover 18 and a connector portion 22 between the two. Connector portion 22 is a thinned out portion of brim 15 which allows cover 18 to move between an open position, as seen in FIG. 1, and a closed position, as illustrated in FIGS. 3, 4 and 6B.

FIG. 2 illustrates a perspective view of fastener 10 with cover 18 in the opened position. FIG. 3 illustrates a top view of fastener 10 with cover 18 in the closed position. As can best be seen in FIG. 4, which is a longitudinal cross sectional view of fastener 10 taken along lines 4A—4A, in the closed position cover 18 is snapped under brim 15 and is secured by tab 20. The downward angle of cover 18 creates a reservoir 28 above cover 18. Reservoir 18 allows for the accumulation of coating material in fastener 10 and assures that fastener 10 bonds with the coating material. As can be seen in FIG. 3, cover 18 does not completely cover the entrance into funnel 14. As a result, coating material accumulates in reservoir 28 and enters funnel 14 below cover 18 further securing fastener 10 to the coating material.

FIG. 5A is a perspective view of fastener 10 with screw 26 disposed within funnel 14 and passing through hole 16 at the bottom of funnel 14. FIG. 5B is a side view of fastener 10 with screw 26 disposed with funnel 14. FIG. 5B illustrates how head 27 of screw 26 cannot pass through hole 16. FIG. 5B also further illustrates how cover 18 snaps under brim 14 and creates reservoir 28.

FIG. 6 illustrates a top view of a fastener 10 having an alternative spider-like larger sized brim 19.

I claim:

1. A fastener comprising a funnel and a brim connected to said funnel, said funnel having a smaller hole on one end and a larger hole on the opposite end, said funnel having at least one hole in a side wall of the funnel for allowing material into which the fastener is inserted to enter the funnel, a cover hinged to the brim and having an open position in which it projects from an outer circumference of the brim portion and a closed position in which it is at least partially under the brim and in the funnel, wherein the brim and the cover are substantially coplanar in the open position; said cover only partially covering the larger hole of the funnel in the closed position.

2. The fastener as claimed in claim 1 wherein the brim and cover are integral.

3. The fastener as claimed in claim 1 wherein the brim and the cover are connected by a thinned out portion of the brim.

4. The fastener as claimed in claim 1 wherein the cover has a tab.

* * * * *